(12) United States Patent
Yamashita et al.

(10) Patent No.: US 8,416,181 B2
(45) Date of Patent: Apr. 9, 2013

(54) BACK LIGHT APPARATUS AND LIQUID CRYSTAL DISPLAY APPARATUS

(75) Inventors: Hiroshi Yamashita, Daito (JP); Yusaku Yamanaka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 426 days.

(21) Appl. No.: 12/473,768

(22) Filed: May 28, 2009

(65) Prior Publication Data

US 2009/0295708 A1  Dec. 3, 2009

(30) Foreign Application Priority Data

May 29, 2008  (JP) ................................ 2008-140281

(51) Int. Cl.
*G09G 3/36*  (2006.01)
(52) U.S. Cl. ...................................................... 345/102
(58) Field of Classification Search .................... 345/102
See application file for complete search history.

(56) References Cited

U.S. PATENT DOCUMENTS

| 2003/0231161 | A1* | 12/2003 | Yamaguchi | 345/102 |
| 2005/0067553 | A1 | 3/2005 | Agari et al. | |
| 2008/0238860 | A1* | 10/2008 | Onodera | 345/102 |
| 2010/0097412 | A1* | 4/2010 | Okabe | 345/691 |

FOREIGN PATENT DOCUMENTS

| EP | 1 445 643 A1 | 8/2004 |
| JP | 2007-140260 A | 6/2007 |
| JP | 2007-279179 A | 10/2007 |
| WO | WO 03/050602 A1 | 6/2003 |

OTHER PUBLICATIONS

European Search Report dated Nov. 4, 2009 (ten (10) pages).

* cited by examiner

*Primary Examiner* — Amr Awad
*Assistant Examiner* — Jonathan Boyd
(74) *Attorney, Agent, or Firm* — Crowell & Moring LLP (57) ABSTRACT

A back light apparatus includes an external light quantity detecting unit having a first and second light quantity detecting sections, both of which are provided at a predetermined position of the housing, a first polarizing plate provided on a light receiving surface of the first light quantity detecting section, which first polarizing plate has a polarizing axis perpendicular to that of a polarizing plate provided on the rear surface side of the liquid crystal panel, a second polarizing plate provided on the light receiving surface of the second light quantity detecting section, which second polarizing plate has the same polarizing axis as that of the polarizing plate provided on the rear surface side of the liquid crystal panel, and an external light quantity calculating section to calculate the external light quantity based on the difference value between light quantities detected by the first and second light quantity detecting sections.

3 Claims, 10 Drawing Sheets

BACK LIGHT APPARATUS AND LIQUID CRYSTAL DISPLAY APPARATUS

BACKGROUND OF THE INVENTION

1. Field of the Invention

The present invention relates to a back light apparatus to be used as a light source of a liquid crystal display panel, and a liquid crystal display apparatus equipped with the back light apparatus.

2. Description of Related Art

A liquid crystal display apparatus performs an image display by controlling an orientation of a liquid crystal put between two electrodes in a liquid crystal display panel to pass or intercept the lights from back lights.

Such a liquid crystal display apparatus has a characteristic in which the visibility of a display image changes according to surrounding brightness. For example, at a bright place, such as an exterior of a house, it is difficult to view the liquid crystal display apparatus if the display luminance thereof is not heightened. On the contrary, at a dark place, such as an interior of a room, it is difficult to view the liquid crystal display apparatus if the display luminance thereof is not lowered.

Accordingly, various techniques for adjusting the display luminance according to a surrounding external light quantity have been conventionally proposed.

For example, Japanese Patent Application Laid-Open Publication No. 2007-140260 proposes a display apparatus that is provided with a photosensor for detecting an external light entering from a display screen to each thin film transistor (TFT) and performs the corrections of color tone values of an image to be displayed on the display screen on the basis of the external light detected by each of the photosensors to perform a display of a suitable display color according to the external light.

Moreover, Japanese Patent Application Laid-Open Publication No. 2007-279179 proposes a luminance adjusting apparatus that is provided with sensors for detecting an external light state on both of the display side and back surface side of a display section and judges the state of receiving the direct rays of the sun according to the difference of the output levels of the two sensors to adjust the luminance of the back lights thereof.

In addition, International Publication WO 2003/050602 discloses a liquid crystal display apparatus that is provided with optical sensors at the four corners of a display panel to control the emission intensities of lights.

However, because the technique disclosed in Japanese Patent Application Laid-Open Publication No. 2007-140260 arranges a sensor to each pixel, the number of parts becomes large. Then, the technique has the problems of causing a rise in cost and making the control of the display apparatus more complicated.

Moreover, since the techniques disclosed in Japanese Patent Application Laid-Open Publication No. 2007-279179 and International Publication WO 2003/050602 arrange the sensors on the edges of the display panels, the sensors detect the external lights at the places different from those of the display panels where the external lights that a user actually views directly enter. As a result, as a screen becomes larger, there arises a problem of generating an error between the light quantity of the actual external lights entering the display panels and that of the external lights to be detected. Moreover, since the techniques disclosed in Japanese Patent Application Laid-Open Publications Nos. 2007-140260 and 2007-279179, and International Publication WO 2003/050602 must attach the sensors for detecting external light quantities onto the display panel sides, the adjustment of the luminance of back lights must be performed in the back light apparatus and the display panels structurally, and the techniques have the problem of a large structural restriction.

SUMMARY OF THE INVENTION

The present invention is directed to provide a back light apparatus capable of emitting lights having more suitable luminance according to a surrounding external light quantity with decreased structural restrictions, and a liquid crystal display apparatus equipped with the back light apparatus, at low cost.

According to a first aspect of the present invention, there is provided a back light apparatus to radiate a light from a back surface side of a liquid crystal panel, the apparatus including: a back light source; a housing provided with the back light source; an external light quantity detecting unit for detecting a quantity of an external light entering the back light apparatus; and a back light adjusting section for adjusting luminance of the back light source based on the external light quantity detected by the external light quantity detecting unit, wherein the external light quantity detecting unit includes: a first light quantity detecting section and a second light quantity detecting section, both being provided at a predetermined position of the housing; a first polarizing plate provided on a light receiving surface of the first light quantity detecting section, the first polarizing plate having a polarizing axis perpendicular to that of a polarizing plate provided on a rear surface side of the liquid crystal panel; a second polarizing plate provided on a light receiving surface of the second light quantity detecting section, the second polarizing plate having a same polarizing axis as that of the polarizing plate provided on the rear surface side of the liquid crystal panel; and an external light quantity calculating section for calculating the external light quantity based on a difference value between a light quantity detected by the first light quantity detecting section and a light quantity detected by the second light quantity detecting section. According to a second aspect of the present invention, there is provided a liquid crystal display apparatus equipped with a back light apparatus for radiating lights from a back surface side of a liquid crystal panel, the liquid crystal display apparatus including: a plurality of back light sources; a housing provided with the back light sources; external light quantity detecting units for detecting quantities of external lights entering the back light apparatus correspondingly to the back light sources; and a back light adjusting section for adjusting luminance of the corresponding back light sources individually based on the external light quantities detected by the external light quantity detecting units provided correspondingly to the back light sources, respectively, wherein the external light quantity detecting units includes: a plurality of first light quantity detecting sections and a plurality of second light quantity detecting sections, each being provided at a predetermined position of the housing; first polarizing plates provided on light receiving surfaces of the first light quantity detecting sections, the first polarizing plates severally having a polarizing axis perpendicular to that of a polarizing plate provided on a rear surface side of the liquid crystal panel; second polarizing plates provided on light receiving surfaces of the second light quantity detecting sections, the second polarizing plates severally having a same polarizing axis as that of the polarizing plate provided on the rear surface side of the liquid crystal panel; and an external light quantity calculating section for calculating the external light quantities based on difference values between light quantities detected by the first light quantity detecting sections and light quantities detected by the second light quantity detecting sections.

According to the present invention, a back light apparatus includes: a back light source; a housing provided with the back light source; an external light quantity detecting unit for detecting a quantity of an external light entering the back light apparatus; and a back light adjusting section for adjusting luminance of the back light source on the basis of the external light quantity detected by the external light quantity detecting unit, wherein the external light quantity detecting unit includes: a first light quantity detecting section and a second light quantity detecting section, both being provided at a predetermined position of the housing; a first polarizing plate provided on a light receiving surface of the first light quantity detecting section, the first polarizing plate having a polarizing axis perpendicular to that of a polarizing plate provided on a rear surface side of the liquid crystal panel; a second polarizing plate provided onto a light receiving surface of the second light quantity detecting section, the second polarizing plate having a same polarizing axis as that of the polarizing plate provided on the rear surface side of the liquid crystal panel; and an external light quantity calculating section for calculating the external light quantity on the basis of a difference value between a light quantity detected by the first light quantity detecting section and a light quantity detected by the second light quantity detecting section.

That is, since the first light quantity detecting section and the second light quantity detecting section, both constituting the external light quantity detecting unit for detecting the external light quantity, are provided to the back light apparatus situated on the back surface side of a liquid crystal panel, which a user views, it becomes possible to detect the external light quantity more accurately in comparison with the case where a detecting section for detecting the external light quantity is provided on the outside of a display surface, and consequently it becomes possible to make the back light apparatus emit a light at more appropriate luminance. Consequently, it is possible to provide a back light apparatus capable of emitting a light at more appropriate luminance according to a surrounding external light quantity at low cost.

Moreover, since the back light apparatus is provided with the external light quantity detecting unit, it becomes possible to detect an external light quantity without providing any sensors for detecting the external light quantity on the liquid crystal panel side, and consequently the structural restriction of the back light apparatus can be reduced.

Moreover, the light receiving surface of the first light quantity detecting section is provided with the first polarizing plate having the polarizing axis perpendicular to that of the polarizing plate provided on the rear surface side of the liquid crystal panel, and the light receiving surface of the second light quantity detecting section is provided with the second polarizing plate having the same polarizing axis as that of the polarizing plate provided on the rear surface side of the liquid crystal panel. An external light quantity is calculated on the basis of the difference value between the light quantity detected by the first light quantity detecting section and the light quantity detected by the second light quantity detecting section. Consequently, although the first light quantity detecting section and the second light quantity detecting section for detecting the external light quantity are arranged on the housing of the back light apparatus, it is possible to calculate an accurate external light quantity without being subjected to the influence of the reflected lights from the back light source in the back light apparatus.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

In the following, the preferred embodiments of the present invention will be described in detail with reference to the attached drawings. Incidentally, the scope of the invention is not limited to the shown examples.

Embodiment 1

First, a liquid crystal display apparatus 100 of an embodiment 1, to which the present invention is applied, will be described.

As shown in FIGS. 1-4, the liquid crystal display apparatus 100 of the present embodiment 1 is provided with a liquid crystal panel 1 and a back light apparatus 10 provided onto a back surface side of the liquid crystal panel 1 to radiate lights from the back surface side.

The liquid crystal panel 1 includes, for example, a pair of substrates provided at a predetermined interval, and a liquid crystal enclosed between the substrates. The liquid crystal is arranged to be twisted by, for example, 90 degrees in a no voltage applied state.

The liquid crystal panel 1 is put between two polarizing plates 2 and 3, the polarizing axes of which are perpendicular to each other. These polarizing plates 2 and 3 transmit only a light component having a vibration plane parallel to the polarizing axes of the polarizing plates 2 and 3, respectively, among incident lights. Consequently, in a no voltage applied state, the back lights emitted from the back light apparatus 10 pass through the polarizing plate 3 arranged on a rear surface side of the liquid crystal panel 1 and are twisted along the liquid crystal molecules, which are twisted by the 90 degrees, and then the twisted lights pass through the polarizing plate 2 arranged on a front surface side of the liquid crystal panel 1 to perform a bright display. On the other hand, in a voltage applied state, the vibration directions of the back lights emitted from the back light apparatus 10 remain the ones along the polarizing axis direction of the polarizing plate 3 arranged on the rear surface side of the liquid crystal panel 1 by the liquid crystal molecules, which have released from their twisted state, and the back lights is intercepted by the polarizing plate 3 provided on the front surface side of the liquid crystal panel 1 to perform a dark display.

The back light apparatus 10 is, for example, a directly under type back light provided on the back surface side of the liquid crystal panel 1, and the back light apparatus 10 houses back light sources C1-C4 within a housing 11 having an opened surface to be provided with a lighting curtain (not shown), diffuser sheet (not shown), or the like, stuck to the opened portion of the housing 11.

Figure 1:
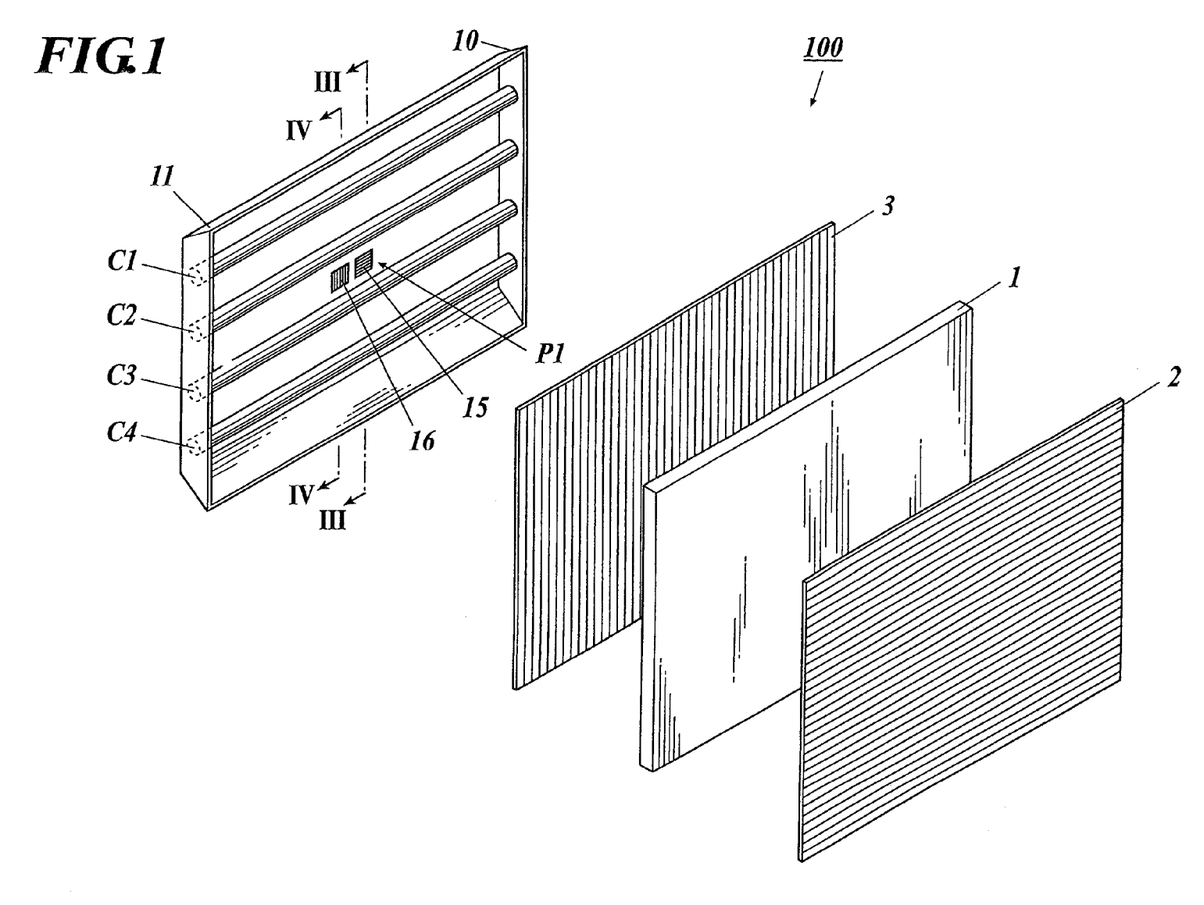
FIG. 1 is a view showing the whole configuration of the liquid crystal display apparatus of an embodiment 1.
Figure 2:
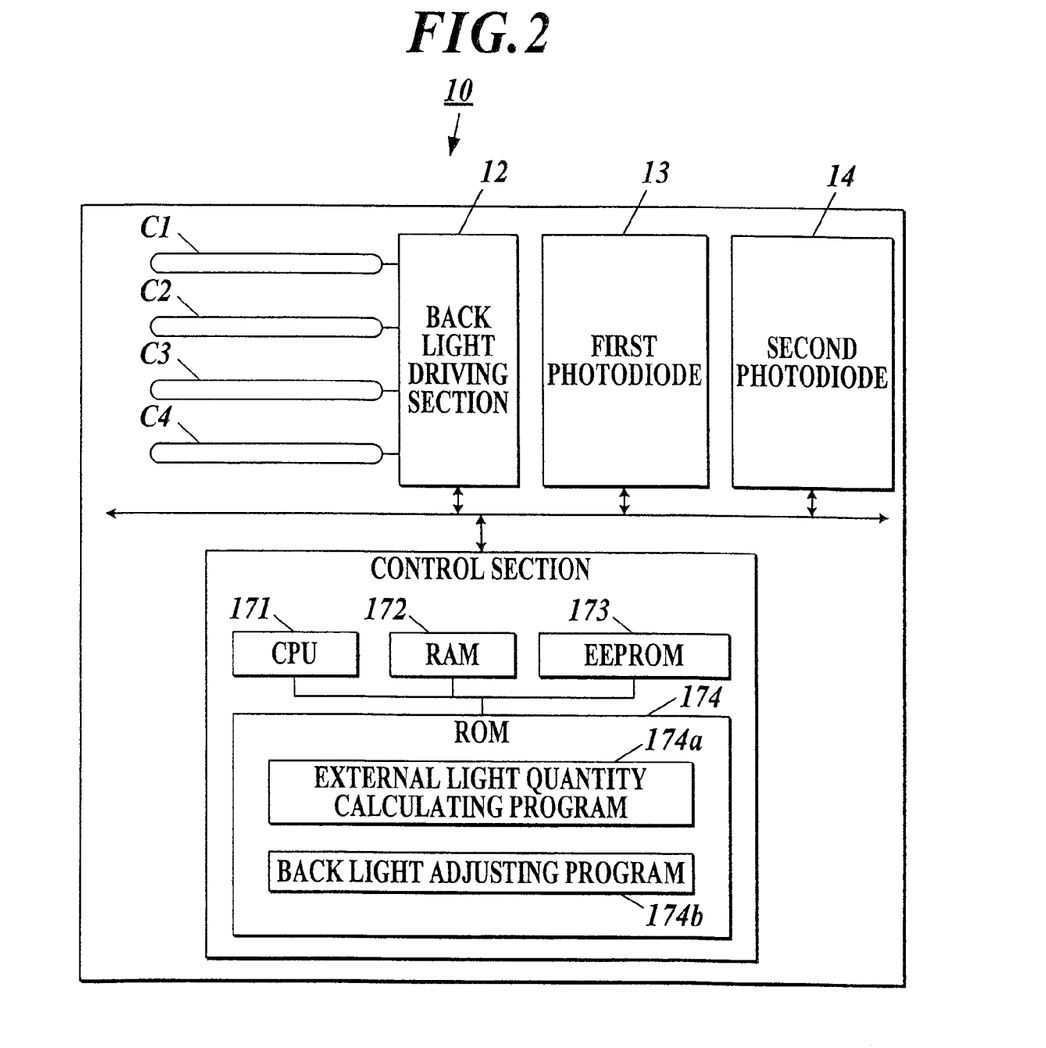
FIG. 2 is a block diagram showing the configuration of the principal part of a back light apparatus provided to the liquid crystal display apparatus of the embodiment 1.

The back light sources C1-C4 are, for example, a plurality (for example, four) of cold cathode fluorescent lamps (CCFLs), and are arranged sequentially along a vertical direction in parallel with one another within the housing 11. The four back light sources C1-C4 are driven by a back light driving section 12 as a back light adjusting section in conformity with the control of a control section 17.

The back light driving section 12 adjusts the luminance of the four back light sources C1-C4 by applying alternating voltages to the four back light sources C1-C4 with inverters (not shown) provided correspondingly to the four back light sources C1-C4.

A first photodiode 13 as a first light quantity detecting section and a second photodiode 14 as a second light quantity detecting section are provided close to each other almost at a central part (predetermined position) P1 of the housing 11, and the first and second photodiodes 13 and 14 detect the light quantity of an incident light.

Figure 3:
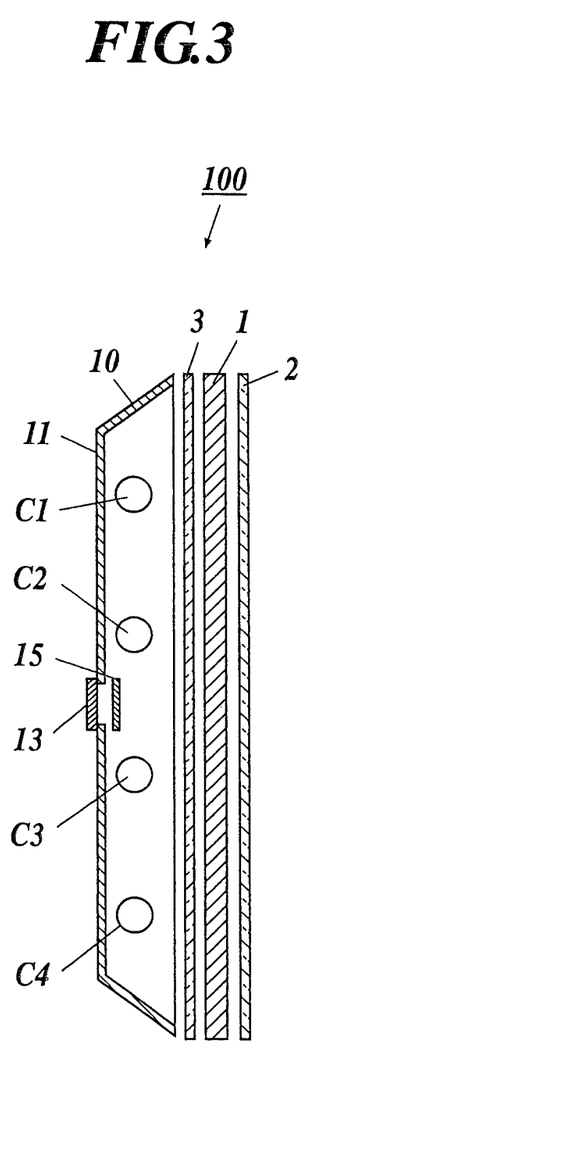
FIG. 3 is a sectional side view taken along the line III-III in FIG. 1.

On a light receiving surface of the first photodiode 13, a first polarizing plate 15 having a polarizing axis perpendicular to that of the polarizing plate 3 provided on the rear surface side of the liquid crystal panel 1 is provided so as to cover the light receiving surface.

Figure 4:
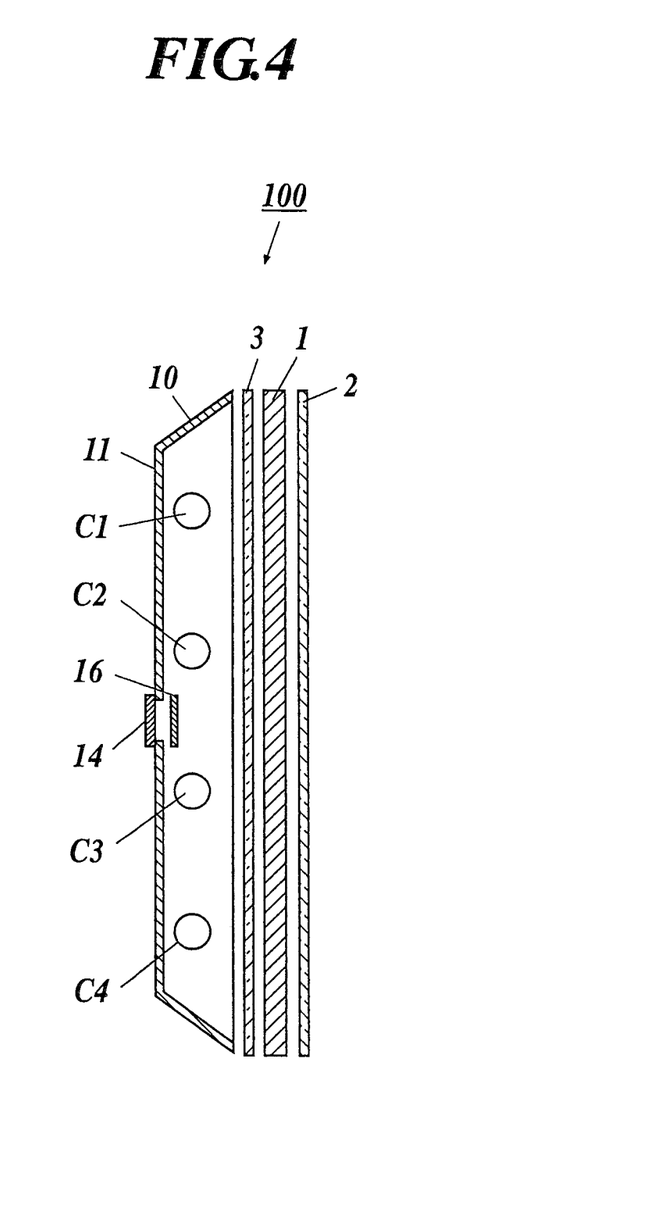
FIG. 4 is a sectional side view taken along the line IV-IV in FIG. 1.

Moreover, on a light receiving surface of the second photodiode 14, a second polarizing plate 16 having the same polarizing axis as that of the polarizing plate 3 provided on the rear surface side of the liquid crystal panel 1 is provided so as to cover the light receiving surface.

Figure 5:
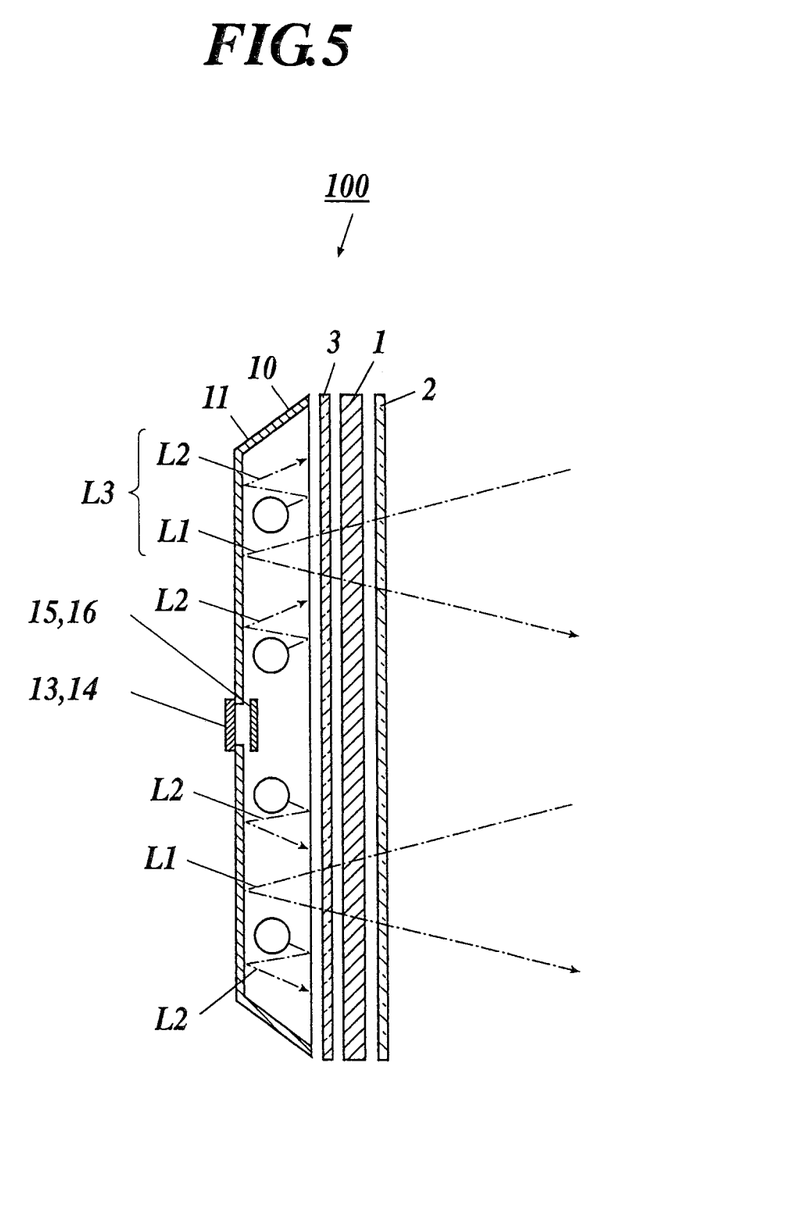
FIG. 5 is a view for illustrating the lights to be detected by the back light apparatus.

FIG. 5 is a view for illustrating the lights to be detected in the back light apparatus 10.

As shown in FIG. 5, external lights from the surroundings enter the back light apparatus 10 through the liquid crystal panel 1. Moreover, in the inner part of the back light apparatus 10, the back lights emitted from the back light sources C1-C4 are being scattered by being reflected by the housing 11, lighting curtain (not shown), diffuser sheet (not shown), and the like of the back light apparatus 10.

Consequently, in the back light apparatus 10, light (hereinafter referred to as mixed lights) L3, in which the external lights L1 entering the back light apparatus 10 from the outside through the liquid crystal panel 1 and reflected lights L2 of the back lights radiated by the back light apparatus 10 itself are mixed, are detected.

Figure 6:
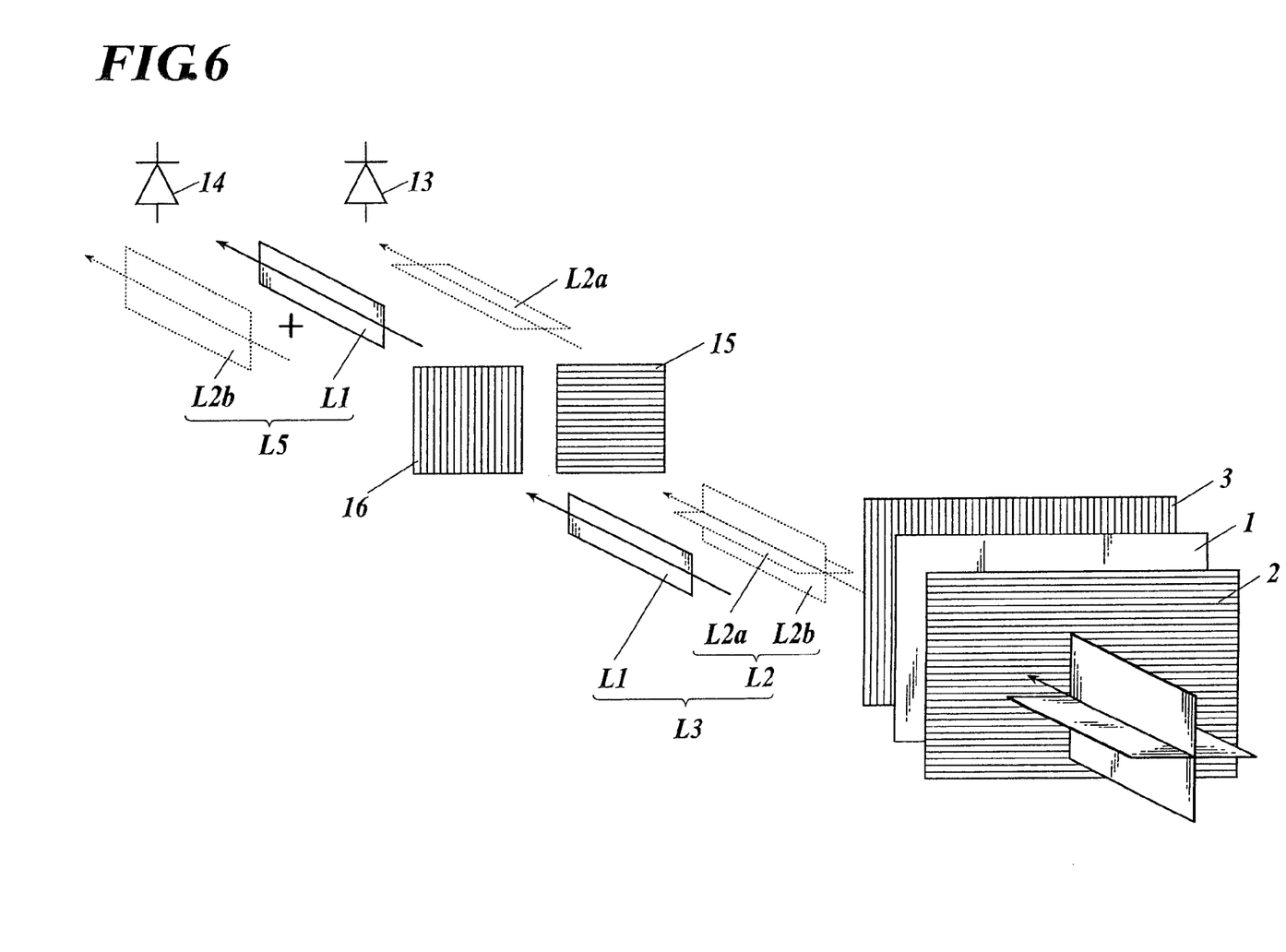
FIG. 6 is a view for illustrating the lights detected by a first photodiode and second photodiode, provided on the housing of the back light apparatus.

FIG. 6 is a view for illustrating the lights to be detected by the first photodiode 13 and the second photodiode 14, which are provided in the housing 11 of the back light apparatus 10. In FIG. 6, the external light L1 entering the housing 11 from the surroundings of the liquid crystal display apparatus 100 is denoted by a solid line, and a reflected lights L2 from the back light sources C1-C4 is denoted by a dotted line.

As shown in FIG. 6, the external light L1 included in the mixed light L3 to be detected at the back light apparatus 10 is a polarization component that has passed through the polarizing plate 2, the liquid crystal panel 1, and the polarizing plate 3 among the external lights L1 entering the display surface of the liquid crystal panel 1, and the external light L1 is vibrating along the direction of the polarizing axis of the polarizing plate 3 arranged on the rear surface side of the liquid crystal panel 1. For example, if the polarizing plate 3 arranged on the rear surface side of the liquid crystal panel 1 has a polarizing axis in the vertical direction, then only the external lights L1 that are vertically vibrating reach the back light apparatus 10.

As described above, since the first polarizing plate 15 provided on the light receiving surface of the first photodiode 13 has the polarizing axis (for example, a horizontal polarizing axis) perpendicular to that of the polarizing plate 3 provided on the rear surface side of the liquid crystal panel 1, the vertically vibrating external light L1, which reaches the back light apparatus 10, is intercepted by the first polarizing plate 15 provided on the light receiving surface of the first photodiode 13, and consequently the external light L1 is not detected by the first photodiode 13.

Moreover, as described above, since the second polarizing plate 16 provided on the light receiving surface of the second photodiode 14 has the polarizing axis (for example, a polarizing axis in the vertical direction) in the same direction as that of the polarizing axis of the polarizing plate 3 provided on the rear surface side of the liquid crystal panel 1, the vertically vibrating external light L1 reaching the back light apparatus 10 from the liquid crystal panel 1 passes through the second polarizing plate 16 provided on the light receiving surface of the second photodiode 14 as it is, and consequently the external light L1 is detected by the second photodiode 14.

On the other hand, the reflected light L2 of the back light included in the mixed light L3 to be detected by the back light apparatus 10 is unpolarized, and includes a vertically vibrating light component and a horizontally vibrating light component.

Consequently, a horizontally vibrating light component L2a included in the reflected light L2 of the back light passes through the first polarizing plate 15 provided on the light receiving surface of the first photodiode 13 to be detected by the first photodiode 13. Moreover, the vertically vibrating light component L2b included in the reflected light L2 of the back light passes through the second polarizing plate 16 provided on the light receiving surface of the second photodiode 14 to be detected by the second photodiode 14.

That is, the first photodiode 13 having the first polarizing plate 15 does not detect the external light L1 entering from the surroundings, but detects only the horizontally vibrating light component L2a included in the reflected light L2 of the back light.

On the other hand, the second photodiode 14 having the second polarizing plate 16 detects the mixed light L5 (L1+L2b) of the external light L1 entering from the surroundings and the vertically vibrating light component L2b included in the reflected light L2 of the back light.

A control section 17 includes, for example, a central processing unit (CPU) 171, a random access memory (RAM) 172 used as a work area of the CPU 171, an electrically erasable programmable ROM (EEPROM) 173, the data stored in which can be rewritten and erased, a read only memory (ROM) 174 storing various programs to be executed by the CPU 171, and the like.

The CPU 171 executes the various programs stored in the ROM 174 according to the input signals input from each section of the liquid crystal display apparatus 100, and outputs output signals to each section on the basis of the executed programs. Thereby, the CPU 171 performs the integrated control of the whole operation of the liquid crystal display apparatus 100.

The ROM 174 stores an external light quantity calculating program 174a as an external light quantity calculating section, a back light adjusting program 174b as the back light adjusting section, and the like, in its program storing area.

The external light quantity calculating program 174a is a program for causing the CPU 171 to realize a function of calculating the external light quantity on the basis of, for example, a difference value between the light quantity detected by the first photodiode 13 and the light quantity detected by the second photodiode 14.

As described above, the first photodiode 13 detects only the horizontally vibrating light component L2a of the reflected light L2 of the back light, and the second photodiode 14 detects the mixed light L5 of the vertically vibrating external light L1 and the vertically vibrating light component L2b of the reflected light L2 of the back light.

Accordingly, by calculating the difference value ((L1+L2b)−L2a) between the light quantity of the light component L2a of the reflected light L2 of the back light detected by the first photodiode 13 and the light quantity of the mixed light L5 (L1+L2b) detected by the second photodiode 14, and by operating a predetermined coefficient, the light quantity (external light quantity) of the external light L1 reaching the back light apparatus 10 can be detected. The predetermined coefficient is a value determined on the basis of the ratio of the light quantity of the horizontally vibrating light component L2a and the light quantity of the vertically vibrating light component L2b, which ratio has been measured in advance according to individual liquid crystal display apparatus 100, and the opening ratio of the liquid crystal panel 1 at the time of detecting the external light quantity.

The CPU 171 executes this external light quantity calculating program 174a, and thereby functions as the external light quantity calculating section.

Here, an external light quantity detecting unit is composed of the aforesaid first photodiode (first light quantity detecting section) 13, the second photodiode (second light quantity detecting section) 14, the first polarizing plate 15 provided on the light receiving surface of the first photodiode 13, the second polarizing plate 16 provided on the light receiving surface of the second photodiode 14, the external light quantity calculating program (external light quantity calculating section) 174a for calculating the external light quantity on the basis of the difference value between the light quantity detected by the first photodiode 13 and the light quantity detected by the second photodiode 14, the CPU 171 executing the external light quantity calculating program 174a, and the like.

The back light adjusting program 174b is a program for causing the CPU 171 to realize a function of adjusting the luminance of the back light sources C1-C4 on the basis of, for example, the external light quantity detected by a back light detecting unit (composed of the first photodiode 13, the second photodiode 14, the first polarizing plate 15, the second polarizing plate 16, the external light quantity calculating program 174a, and the CPU 171).

In the execution of the back light adjusting program 174b, the CPU 171 adjusts the luminance of a back light by controlling the back light driving section 12 according to the external light quantity calculated in the execution of the aforesaid external light quantity calculating program 174a.

The CPU 171 executes this back light adjusting program 174b, and thereby functions as the back light adjusting section together with the back light driving section 12.

According to the liquid crystal display apparatus 100 of the embodiment 1 described above, since the first light quantity detecting section (first photodiode 13) and the second light quantity detecting section (second photodiode 14), each constituting the external light quantity detecting unit to detect the external light quantity, is provided to the back light apparatus 10 situated on the back surface side of the liquid crystal panel 1 to be viewed by a user, it becomes possible to detect a more accurate external light quantity in comparison with the case where the detecting unit to detect the external light quantity is provided on the outside of the display surface, and thereby it becomes possible to make the back light apparatus 10 emit light at more appropriate luminance. Consequently, it becomes possible to provide the back light apparatus 10 and the liquid crystal display apparatus 100 capable of emitting lights at more appropriate luminance according to a surrounding external light quantity at low cost.

Moreover, since the external light quantity detecting unit is provided to the back light apparatus 10, the external light quantity can be detected without providing any sensors to detect the external light quantity to the liquid crystal panel side, and consequently the structural restriction can be reduced.

Moreover, the first polarizing plate 15 having the polarizing axis perpendicular to that of the polarizing plate 3 provided on the rear surface side of the liquid crystal panel 1 is provided on the light receiving surface of the first light quantity detecting section (first photodiode 13), and the second polarizing plate 16 having the same polarizing axis as that of the polarizing plate 3 provided on the rear surface side of the liquid crystal panel 1 is provided on the light receiving surface of the second light quantity detecting section (second photodiode 14). Then, the external light quantity is calculated on the basis of the difference value between the light quantity detected by the first light quantity detecting section (first photodiode 13) and the light quantity detected by the second light quantity detecting section (second photodiode 14). Consequently, although the first light quantity detecting section and the second light quantity detecting section, each for detecting the external light quantity, are arranged on the housing 11 of the back light apparatus 10, an accurate external light quantity can be calculated without being subjected to the influences of the reflected lights from the back light sources C1-C4 of the back light apparatus 10.

Embodiment 2

Next, a liquid crystal display apparatus 200 of an embodiment 2, to which the present invention is applied, will be described.

Incidentally, in the following description, the similar components to those of the embodiment 1 are denoted by the same referential marks as those of the similar components of the embodiment 1, and their descriptions will be omitted.

Figure 7:
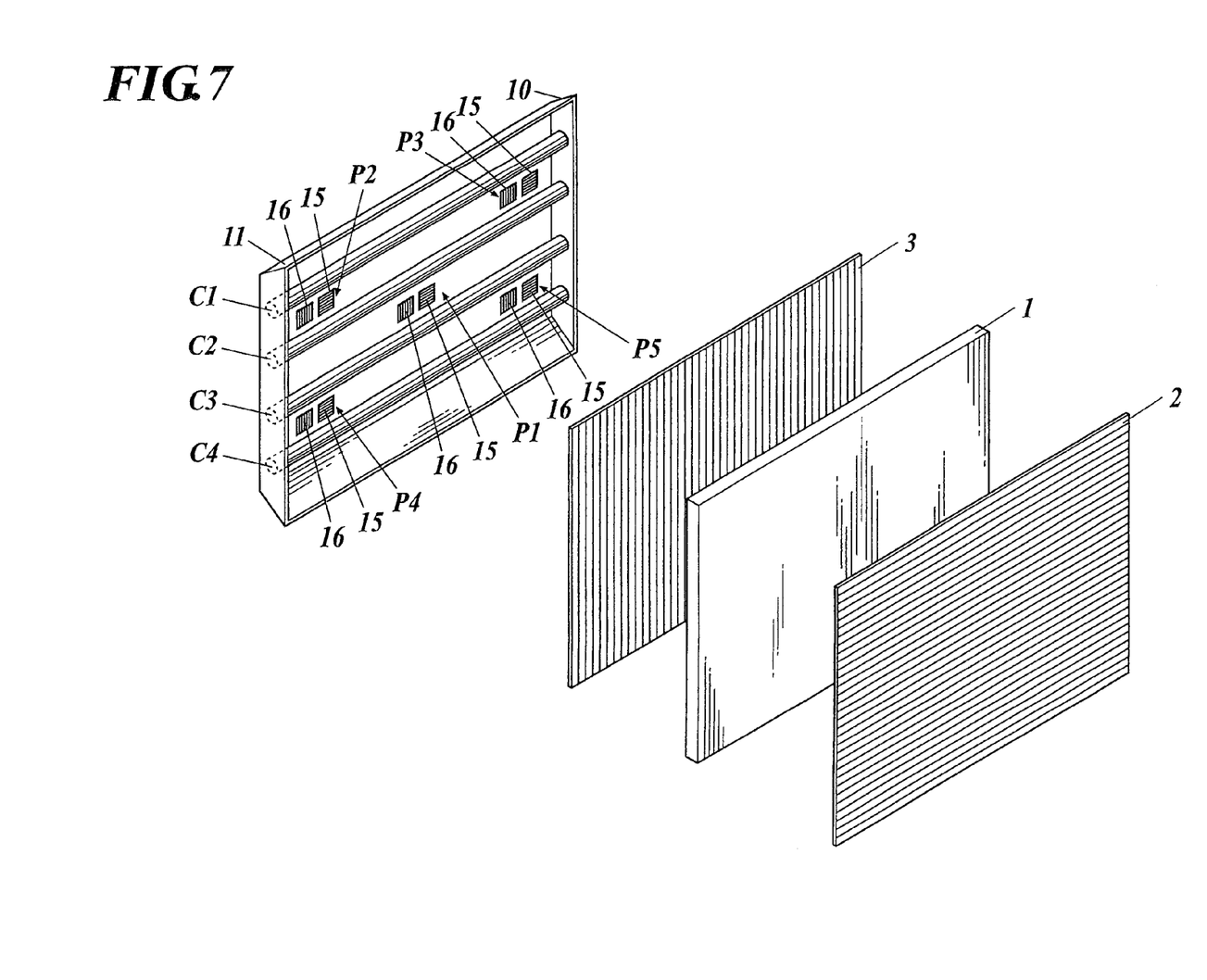
FIG. 7 is a view showing the whole configuration of the liquid crystal display apparatus of an embodiment 2.
Figure 8:
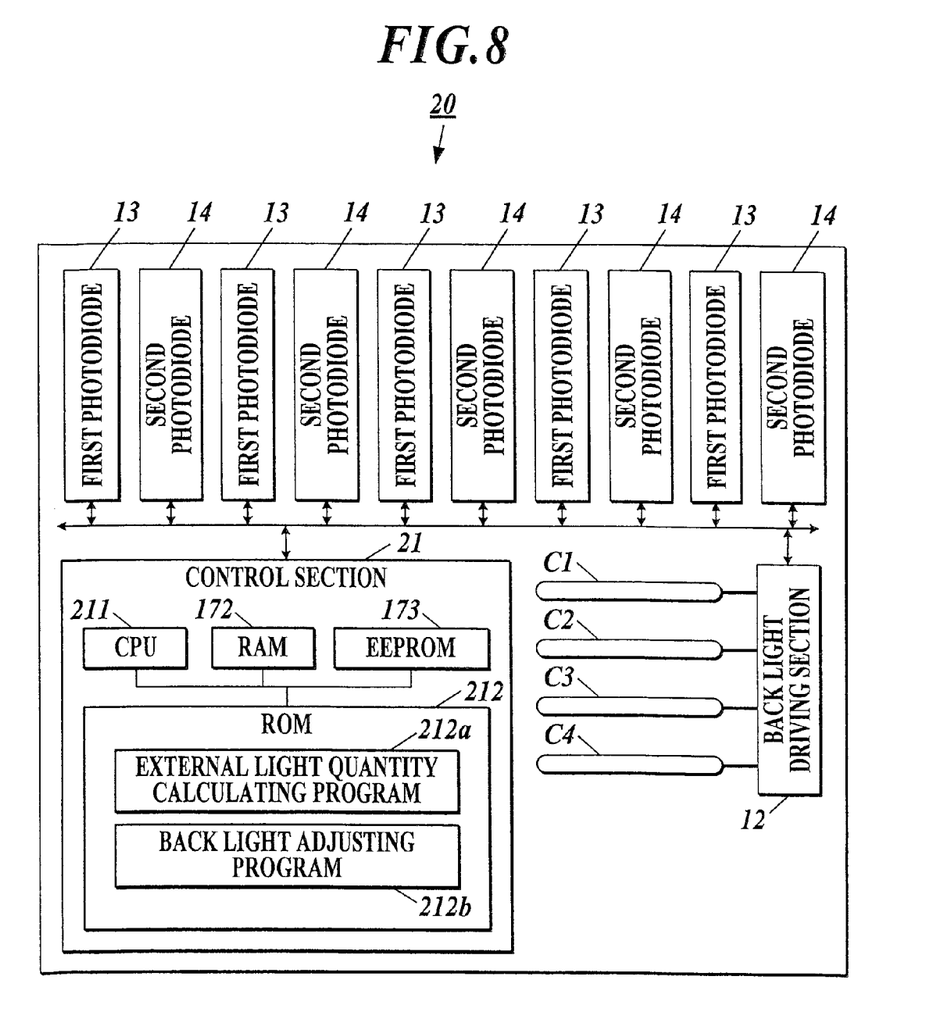
FIG. 8 is a block diagram showing the configuration of the principal part of the back light apparatus provided in the liquid crystal display apparatus of the embodiment 2.

As shown in FIGS. 7 and 8, the liquid crystal display apparatus 200 of the present embodiment 2 includes the liquid crystal panel 1 and a back light apparatus 20 provided on the back surface side of the liquid crystal panel 1 and radiating lights from the back surface side.

The first photodiodes 13 as the first light quantity detecting sections and the second photodiodes 14 as the second light quantity detecting sections are provided close to each other at respective predetermined positions of the housing 11, that is, at almost the central part P1, a position P2 near to the left end in a first space between the back light source C1 in a first row and the back light source C2 in a second row, a position P3 near to the right end in the first space, a position P4 near to the left end in a second space between the back light source C3 in a third row and the back light source C4 in a fourth row, and a position P5 near to the right end in the second space. The first and second photodiodes 13 and 14 detect the light quantities of the incident lights into the respective five positions P1-P5.

Since the light receiving surface of the first photodiode 13 arranged in each of the five positions P1-P5 is covered by the first polarizing plate 15 having the polarizing axis (for example, horizontally polarizing axis) perpendicular to that of the polarizing plate 3 provided on the rear surface side of the liquid crystal panel 1 similarly to the embodiment 1, the first photodiode 13 detects only the light component L2a of the reflected light L2 of the back light.

Moreover, since the light receiving surface of the second photodiode 14 arranged at each of the five positions P1-P5 is covered by the second polarizing plate 16 having the polarizing axis (for example, the polarizing axis in the vertical direction) in the same direction as that of the polarizing plate 3 provided on the rear surface side of the liquid crystal panel 1, the second photodiode 14 detects the mixed light L5 (L1+L2b) of the external light L1 entering from the surroundings and the light component L2b of the reflected light L2 of the back light.

A control section 21 includes, for example, a central processing unit (CPU) 211, a random access memory (RAM) 172 to be used as the work area of the CPU 211, an electrically erasable programmable ROM (EEPROM) 173, the data stored in which can be rewritten and erased, a read only memory (ROM) 212 to store various programs to be executed by the CPU 211, and the like.

A CPU 211 executes the various programs stored in the ROM 212 according to the input signals input from each section of the liquid crystal display apparatus 200, and outputs output signals to each section on the basis of the executed programs. Thereby, the CPU 211 performs the integrated control of the whole operation of the liquid crystal display apparatus 200.

The ROM 212 stores an external light quantity calculating program 212a as the external light quantity calculating section, a back light adjusting program 212b as the back light adjusting section, and the like, in its program storing area.

The external light quantity calculating program 212a is a program for causing the CPU 211 to realize the function of calculating the external light quantity at each of the predetermined positions P1-P5 of the housing 11 on the basis of, for example, the difference value between the light quantity detected by the first photodiode 13 and the light quantity detected by the second photodiode 14 in each pair of the first photodiode 13 and second photodiode 14 provided at each of the positions P1-P5 of the housing 11.

In the execution of the external light quantity calculating program 212a, the CPU 211 detects the light quantity (external light quantity) of the external light L1 at each positions P1-P5 on the basis of the difference value ((L1+L2b)−L2a) between the light quantity of the light component L2a of the reflected light L2 of the back light detected by the first photodiode 13 at each of the positions P1-P5 and the light quantity of the mixed light L5 (L1+L2b) detected by the second photodiode 14 at each of the positions P1-P5. Thereby, the external light quantities at the five positions P1-P5 of the housing 11 can be detected individually, that is, the external light quantity at almost the central part P1, the external light quantity at the position P2 near to the left end in the first space between the back light source C1 in the first row and the back light source C2 in the second row, the external light quantity at the position P3 near to the right end in the first space, the external light quantity at the position P4 near to the left end in the second space between the back light source C3 in the third row and the back light source C4 in the fourth row, and the external light quantity at the position P5 near to the right end in the second space can be detected individually.

The CPU 211 executes this external light quantity calculating program 212a, and thereby functions as the external light quantity calculating section.

Here, an external light quantity detecting unit is composed of the aforesaid first photodiodes (first light quantity detecting sections) 13, the second photodiodes (second light quantity detecting sections) 14, the first polarizing plates 15 provided on the light receiving surfaces of the first photodiodes 13, the second polarizing plates 16 provided on the light receiving surfaces of the second photodiodes 14, the external light quantity calculating program (external light quantity calculating section) 212a for calculating the external light quantities on the basis of the difference values between the light quantities detected by the first photodiodes 13 and the light quantities detected by the second photodiodes 14, the CPU 211 executing the external light quantity calculating program 212a, and the like.

The back light adjusting program 212b is a program for causing the CPU 211 to realize the function of adjusting the luminance of the back light sources C1-C4 on the basis of, for example, the mean value of the external light quantities detected by a plurality of back light detecting units (each composed of the first photodiode 13, the second photodiode 14, the first polarizing plate 15, the second polarizing plate 16, the external light quantity calculating program 212a, and the CPU 211).

In the execution of the back light adjusting program 212b, the CPU 211 first calculates the mean value of the external light quantities at the five positions P1-P5 calculated by the execution of the external light quantity calculating program 212a mentioned above. That is, the CPU 211 calculates the mean value of the external light quantity at almost the central part P1, the external light quantity at the position P2 near to the left end in the first space between the back light source C1 in the first row and the back light source C2 in the second row, the external light quantity at the position P3 near to the right end in the first space, the external light quantity at the position P4 near to the left end in the second space between the back light source C3 in the third row and the back light source C4 in the fourth row, and the external light quantity at the position P5 near to the right end in the second space. Then, the CPU 211 adjusts the luminance of the back light sources C1-C4 by controlling the back light driving section 12 according to the calculated mean value of the external light quantities.

The CPU 211 executes this back light adjusting program 212b, and thereby functions as the back light adjusting section together with the back light driving section 12.

According to the liquid crystal display apparatus 200 of the embodiment 2 described above, since the plurality of first light quantity detecting sections (first photodiodes 13) and second light quantity detecting sections (second photodiodes 14) constituting the external light quantity detecting units to detect the external light quantities is provided to the back light apparatus 20 situated on the back surface side of the liquid crystal panel 1 to be viewed by a user, it becomes possible to detect the more accurate external light quantities in comparison with the case where the detecting unit to detect the external light quantity is provided on the outside of the display surface, and thereby it becomes possible to make the back light apparatus 20 emit lights at more appropriate luminance. Consequently, it becomes possible to provide the back light apparatus 20 and the liquid crystal display apparatus 200 capable of emit lights at more appropriate luminance according to the quantities of surrounding external lights at low cost.

Moreover, since the external light quantity detecting units are provided to the back light apparatus 20, external light quantities can be detected without providing any sensors to detect the external light quantities on the liquid crystal panel side, and consequently the structural restriction can be reduced.

Moreover, the first polarizing plate 15 having the polarizing axis perpendicular to that of the polarizing plate 3 provided on the rear surface side of the liquid crystal panel 1 is provided on the light receiving surface of each of the first light quantity detecting sections (first photodiodes 13), and the second polarizing plate 16 having the same polarizing axis as that of the polarizing plate 3 provided on the rear surface side of the liquid crystal panel 1 is provided on the light receiving surface of each of the second light quantity detecting sections (second photodiodes 14). Then, the external light quantities are calculated on the basis of the difference values between the light quantities detected by the first light quantity detecting sections (first photodiodes 13) and the light quantities detected by the second light quantity detecting sections (second photodiodes 14). Consequently, although the first light quantity detecting sections and the second light quantity detecting sections for detecting the external light quantities are arranged on the housing 11 of the back light apparatus 20, the accurate external light quantities can be calculated without being subjected to the influences of the reflected lights from the back light sources C1-C4 of the back light apparatus 20.

Furthermore, the plurality of external light quantity detecting units is provided, and the luminance of the back light sources C1-C4 is adjusted by the back light adjusting section on the basis of the mean value of the respective external light quantities detected by the plurality of external light quantity detecting units. Consequently, back light sources C1-C4 can be made to emit lights at more appropriate luminance for a user to view the liquid crystal panel 1.

Embodiment 3

Next, a liquid crystal display apparatus 300 of an embodiment 3, to which the present invention is applied, will be described.

Incidentally, in the following description, the similar components to those of the embodiment 1 or 2 are denoted by the same referential marks as those of the similar components of the embodiment 1 or 2, and their descriptions will be omitted.

Figure 9:
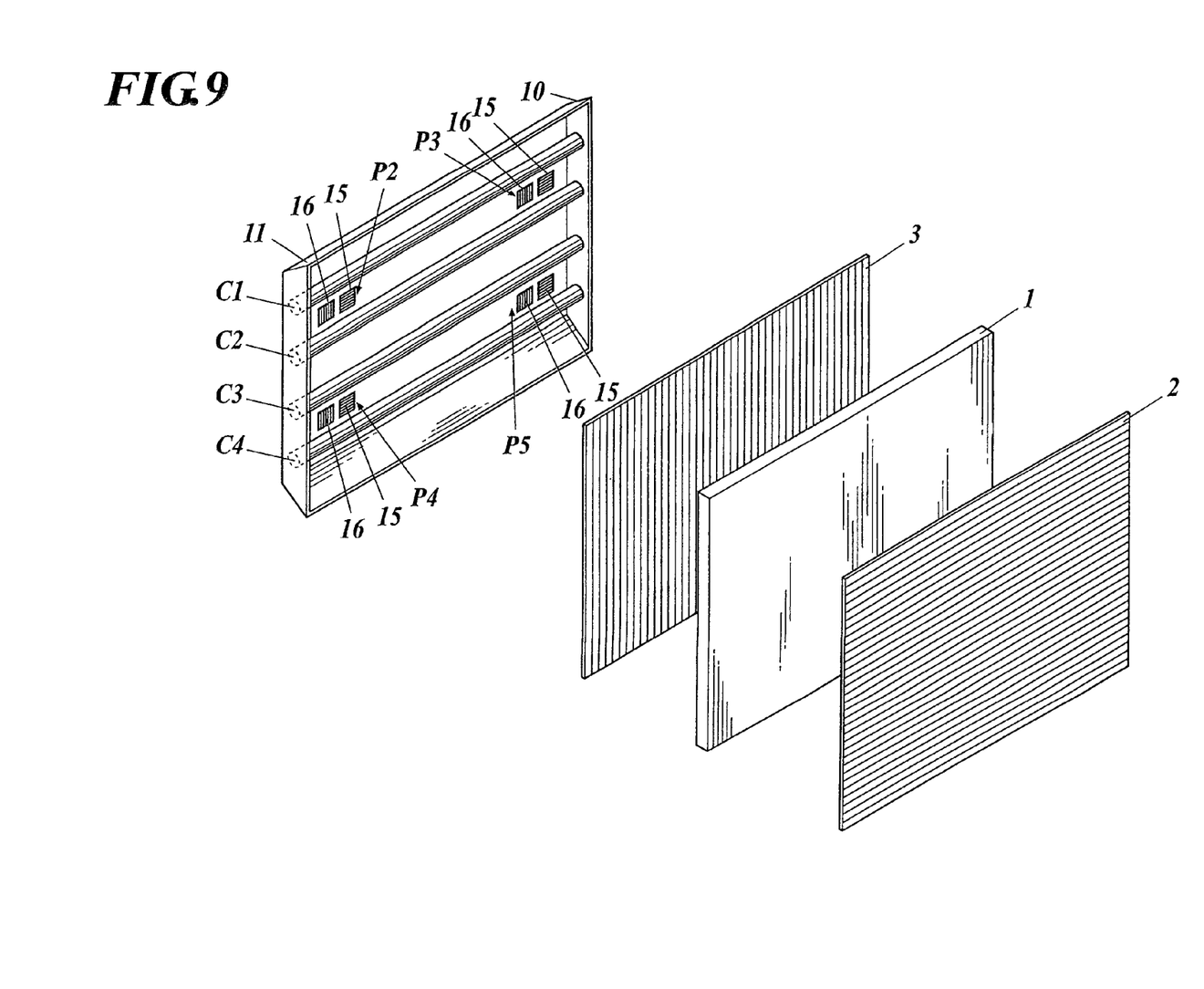
FIG. 9 is a view showing the whole configuration of the liquid crystal display apparatus of an embodiment 3.
Figure 10:
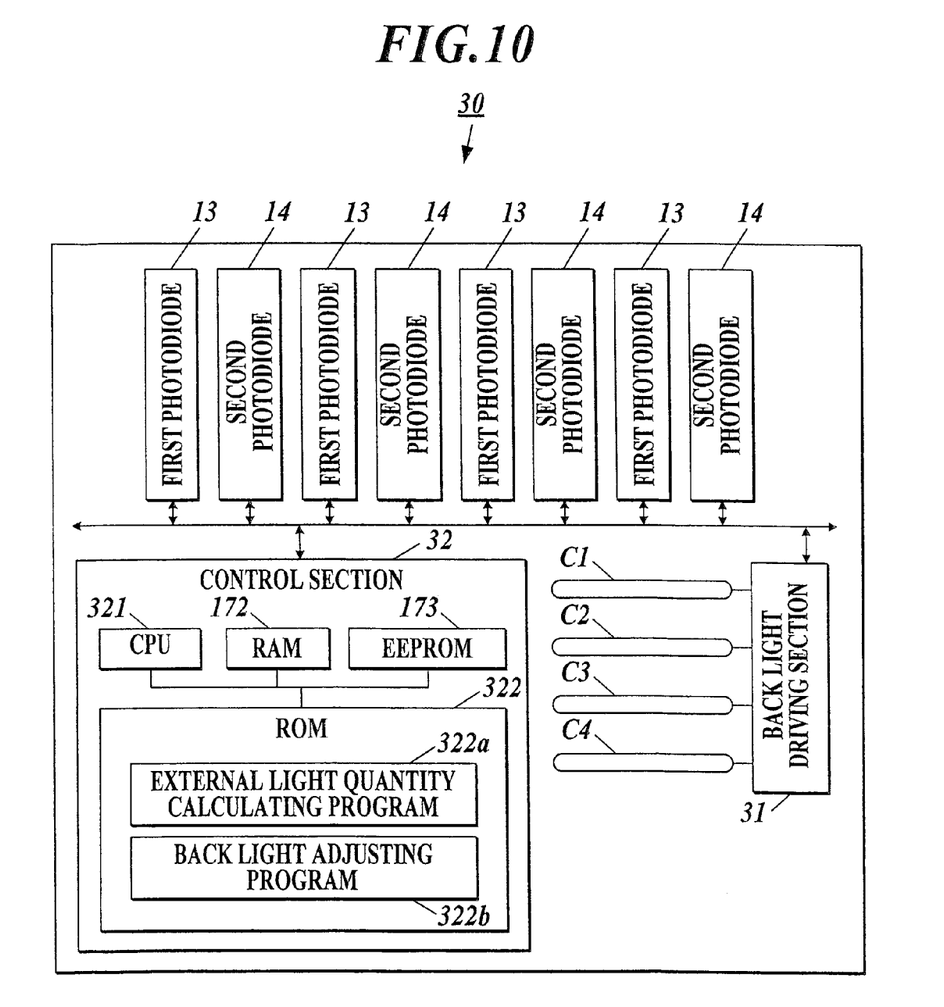
FIG. 10 is a block diagram showing the configuration of the principal part of a back light apparatus provided to the liquid crystal display apparatus of the embodiment 3.

As shown in FIGS. 9 and 10, the liquid crystal display apparatus 300 of the present embodiment 3 includes the liquid crystal panel 1 and a back light apparatus 30 provided on the back surface side of the liquid crystal panel 1 and radiating lights from the back surface side.

A back light driving section 31 adjusts the luminance of the four back light sources C1-C4 individually by applying alternating voltages to the four back light sources C1-C4 with inverters (not shown) provided correspondingly to the four back light sources C1-C4, respectively.

The first photodiode 13 as the first light quantity detecting section and the second photodiode 14 as the second light quantity detecting section are provided close to each other at each of the predetermined positions P2-P5 correspondingly to the back light sources C1-C4, respectively. The first and second photodiodes 13 and 14 detect the light quantity of an incident light into each of the positions P2-P5.

For example, pairs of the first photodiodes 13 and the second photodiodes 14 corresponding to the back light source C1 in the first row and the back light source C2 in the second row, respectively, are arranged at the position P2 near to the left end and the position P3 near to the right end in the first space between the back light source C1 in the first row and the back light source C2 in the second row. Moreover, pairs of the first photodiodes 13 and the second photodiodes 14 corresponding to the back light source C3 in the third row and the back light source C4 in the fourth row, respectively, are arranged at the position P4 near to the left end and the position P5 near to the right end in the second space between the back light source C3 in the third row and the back light source C4 in the fourth row.

Since the light receiving surface of the first photodiode 13 arranged in each of the four positions P2-P5 is covered by the first polarizing plate 15 having the polarizing axis (for example, horizontally polarizing axis) perpendicular to that of the polarizing plate 3 provided on the rear surface side of the liquid crystal panel 1 similarly to the embodiments 1 and 2, the first photodiode 13 detects only the light component L2$a$ of the reflected light L2 of the back light.

Moreover, since the light receiving surface of the second photodiode 14 arranged at each of the four positions P2-P5 is covered by the second polarizing plate 16 having the polarizing axis (for example, the polarizing axis in the vertical direction) in the same direction as that of the polarizing plate 3 provided on the rear surface side of the liquid crystal panel 1, the second photodiode 14 detects the mixed light L5 (L1+L2$b$) of the external light L1 entering from the surroundings and the light component L2$b$ of the reflected light L2 of the back light.

A control section 32 includes, for example, a central processing unit (CPU) 321, the random access memory (RAM) 172 to be used as the work area of the CPU 321, the electrically erasable programmable ROM (EEPROM) 173, the data stored in which can be rewritten and erased, a read only memory (ROM) 322 to store various programs to be executed by the CPU 321, and the like.

The CPU 321 executes the various programs stored in the ROM 322 according to the input signals input from each section of the liquid crystal display apparatus 300, and outputs output signals to each section on the basis of the executed programs. Thereby, the CPU 321 performs the integrated control of the whole operation of the liquid crystal display apparatus 300.

The ROM 322 stores an external light quantity calculating program 322$a$ as the external light quantity calculating section, a back light adjusting program 322$b$ as the back light adjusting section, and the like, in its program storing area.

The external light quantity calculating program 322$a$ is a program for causing the CPU 321 to realize the function of calculating the external light quantity at each of the plurality of positions P2-P5 of the housing 11 on the basis of, for example, the difference value between the light quantity detected by the first photodiode 13 and the light quantity detected by the second photodiode 14 in each pair of the first photodiode 13 and second photodiode 14 provided at each of the positions P2-P5 of the housing 11.

In the execution of the external light quantity calculating program 322$a$, the CPU 321 detects the light quantity (external light quantity) of the external light L1 on the basis of the difference value ((L1+L2$b$)−L2$a$) between the light quantity of the light component L2$a$ of the reflected light L2 of the back light detected by the first photodiode 13 at each of the positions P2-P5 and the light quantity of the mixed light L5 (L1+L2$b$) detected by the second photodiode 14 at each of the positions P2-P5. Thereby the external light quantities at the four positions P2-P5 of the housing 11 can be detected individually, that is, the external light quantity at the position P2 near to the left end in the first space between the back light source C1 in the first row and the back light source C2 in the second row, the external light quantity at the position P3 near to the right end in the first space, the external light quantity at the position P4 near to the left end in the second space between the back light source C3 in the third row and the back light source C4 in the fourth row, and the external light quantity at the position P5 near to the right end in the second space can be detected individually.

The CPU 321 executes this external light quantity calculating program 322a, and thereby functions as the external light quantity calculating section.

Here, an external light quantity detecting unit is composed of the aforesaid first photodiodes (first light quantity detecting sections) 13, the second photodiodes (second light quantity detecting sections) 14, the first polarizing plates 15 provided on the light receiving surfaces of the first photodiodes 13, the second polarizing plates 16 provided on the light receiving surfaces of the second photodiodes 14, the external light quantity calculating program (external light quantity calculating section) 321a for calculating the external light quantities on the basis of the difference values between the light quantities detected by the first photodiodes 13 and the light quantities detected by the second photodiodes 14, the CPU 321 executing the external light quantity calculating program 321a, and the like.

The back light adjusting program 322b is a program for causing the CPU 321 to realize the function of adjusting the luminance of the corresponding back light sources C1-C4 individually according to, for example, the external light quantities detected by the external light quantity detecting units (each composed of the first photodiode 13, the second photodiode 14, the first polarizing plate 15, the second polarizing plate 16, the external light quantity calculating program 322a, and the CPU 321) provided correspondingly to the back light sources C1-C4.

In the execution of the back light adjusting program 322b, the CPU 321 first calculates the mean value of the external light quantity at the position P2 and the external light quantity at the position P3, both the quantities being calculated by the execution of the external light quantity calculating program 322a mentioned above. Then, the CPU 321 adjusts the luminance of the back light source C1 in the first row and the back light source C2 in the second row, corresponding to the first photodiode 13 and second photodiode 14 arranged at the two positions P2 and P3, respectively, by controlling the back light driving section 31 according to the calculated mean value of the external light quantities.

Moreover, the CPU 321 calculates the mean value of the external light quantity at the position P4 and the external light quantity at the position P5, both the quantities being calculated by the execution of the external light quantity calculating program 322a mentioned above. Then, the CPU 321 adjusts the luminance of the back light source C3 in the third row and the back light source C4 in the fourth row, corresponding to the first photodiode 13 and second photodiode 14 arranged at the two positions P4 and P5, respectively, by controlling the back light driving section 31 according to the calculated mean value of the external light quantities.

The CPU 321 executes this back light adjusting program 322b, and thereby functions as the back light adjusting section together with the back light driving section 31.

According to the liquid crystal display apparatus 300 of the embodiment 3 described above, since the first light quantity detecting sections (first photodiodes 13) and second light quantity detecting sections (second photodiodes 14) constituting the external light quantity detecting units to detect the external light quantities are provided to the back light apparatus 30 situated on the back surface side of the liquid crystal panel 1 to be viewed by a user, it becomes possible to detect the more accurate external light quantities in comparison with the case where the detecting unit to detect the external light quantity is provided on the outside of the display surface, and thereby it becomes possible to make the back light apparatus 30 emit lights at more appropriate luminance. Consequently, it becomes possible to provide the back light apparatus 30 and the liquid crystal display apparatus 300 capable of emit lights at more appropriate luminance according to the quantities of surrounding external lights at low cost.

Moreover, since the external light quantity detecting units are provided to the back light apparatus 30, external light quantities can be detected without providing any sensors to detect the external light quantities on the liquid crystal panel side, and consequently the structural restriction can be reduced.

Moreover, the first polarizing plate 15 having the polarizing axis perpendicular to that of the polarizing plate 3 provided on the rear surface side of the liquid crystal panel 1 is provided on the light receiving surface of each of the first light quantity detecting sections (first photodiodes 13), and the second polarizing plate 16 having the same polarizing axis as that of the polarizing plate 3 provided on the rear surface side of the liquid crystal panel 1 is provided on the light receiving surface of each of the second light quantity detecting sections (second photodiodes 14). Then, the external light quantities are calculated on the basis of the difference values between the light quantities detected by the first light quantity detecting sections (first photodiodes 13) and the light quantities detected by the second light quantity detecting sections (second photodiodes 14). Consequently, although the first light quantity detecting sections (first photodiodes 13) and second light quantity detecting sections (second photodiodes 14) for detecting the external light quantities are arranged on the housing 11 of the back light apparatus 30, accurate external light quantities can be calculated without being subjected to the influences of the reflected lights from the back light sources C1-C4 of the back light apparatus 30.

Furthermore, the plurality of back light sources C1-C4 is provided, and the plurality of external light quantity detecting units is provided correspondingly to the back light sources C1-C4. The luminance of the corresponding back light sources C1-C4 is individually adjusted by the back light adjusting section according to the external light quantities detected by the external light quantity detecting units provided correspondingly to the back light sources C1-C4.

Consequently, the luminance of the corresponding back light sources C1-C4 can be individually adjusted according to the external light quantity detected in each of the plurality of positions (for example, positions P2-P5) of the housing 11 of the back light apparatus 30. Consequently, even if the external light quantities entering the back light apparatus 30 are different at each place, the luminance of the back light sources C1-C4 can be adjusted according to the external light quantity detected at the position corresponding to the back light apparatus 30, and each of the back light sources C1-C4 can be made to emit a light at more appropriate luminance for a user to view the liquid crystal panel 1.

Incidentally, the scope of the present invention is not limited to the embodiments described above, but various improvements and changes of their designs may be performed without departing from the spirit and scope of the present invention.

For example, the form of the back light apparatus and the kind and number of the back light sources are arbitrary. Although the embodiments described above use the directly under type back light apparatus as the back light apparatus, for example, side edge type back light apparatus may be used. Moreover, although tube-shaped light sources are used as the back light sources, for example, light emitting diodes (LED) and the like may be used. The LEDs may be provided in a matrix.

Moreover, the number and arrangement positions of the first and second light quantity detecting sections are also arbitrary. For example, one or a plurality of pairs of first light quantity detecting sections and second light quantity detecting sections may be associated to each back light source.

Moreover, for example, if each of five pairs of first light quantity detecting sections and second light quantity detecting sections are arranged so as to put four rows of back light sources between each pair, then a back light apparatus may be configured to adjust the luminance of each back light source on the basis of the light quantities detected by two pairs of first light quantity detecting sections and second light quantity detecting sections arranged on both the sides of the back light source. Thereby, it becomes possible to detect a more accurate external light quantity by utilizing an external light quantity detecting unit efficiently without increasing the number of the external light quantity detecting units.

The entire disclosure of Japanese Patent Application No. 2008-140281 filed on May 29, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A back light apparatus to radiate a light from a back surface side of a liquid crystal panel, the apparatus comprising:
    a plurality of back light sources;
    a housing provided with the back light sources;
    a plurality of external light quantity detecting units, which are respectively provided corresponding to the plurality of backlight sources, for detecting quantities of external light entering the back light apparatus through the liquid crystal panel; and
a back light adjusting section for individually adjusting a respective luminance of the back light sources based on the external light quantities detected by the corresponding external light quantity detecting units, wherein
the external light quantity detecting units include:
first light quantity detecting sections and second light quantity detecting sections, each being provided at predetermined positions of the housing;
first polarizing plates provided on light receiving surfaces of the first light quantity detecting sections, the first polarizing plates having a polarizing axis perpendicular to that of a polarizing plate provided on a rear surface side of the liquid crystal panel;
second polarizing plates provided on light receiving surfaces of the second light quantity detecting sections, the second polarizing plates having a same polarizing axis as that of the polarizing plate provided on the rear surface side of the liquid crystal panel; and
an external light quantity calculating section for calculating the external light quantities based on i) difference values between the light quantities detected by the first light quantity detecting sections and the light quantities detected by the second light quantity detecting sections, and ii) a predetermined coefficient,
wherein the predetermined coefficient is a value determined based on iii) a ratio of a light quantity of a horizontally vibrating light component and a light quantity of a vertically vibrating light component, which ratio has been measured in advance for a particular back light apparatus, and iv) an opening ratio of the liquid crystal panel at a time of detecting quantities of the external light.

2. The back light apparatus according to claim 1, wherein the back light adjusting section adjusts the luminance of the back light sources based on a mean value of external light quantities detected by the plurality of external light quantity detecting units, respectively.

3. A liquid crystal display apparatus equipped with a back light apparatus according to claim 1.

* * * * *